United States Patent
King

(10) Patent No.: US 9,668,552 B2
(45) Date of Patent: Jun. 6, 2017

(54) SKI POLE SHAFT INCLINOMETER AS STICKER OR IMAGE

(71) Applicant: Grayson Carey King, Burlington, VT (US)

(72) Inventor: Grayson Carey King, Burlington, VT (US)

(*) Notice: Subject to any disclaimer, the term of this patent is extended or adjusted under 35 U.S.C. 154(b) by 301 days.

(21) Appl. No.: 14/695,175

(22) Filed: Apr. 24, 2015

(65) Prior Publication Data

US 2015/0306487 A1     Oct. 29, 2015

Related U.S. Application Data

(60) Provisional application No. 61/983,959, filed on Apr. 24, 2014.

(51) Int. Cl.
| | |
|---|---|
| *G01C 9/00* | (2006.01) |
| *A45B 3/00* | (2006.01) |
| *G01C 9/12* | (2006.01) |
| *G01C 9/02* | (2006.01) |
| *A63C 11/22* | (2006.01) |

(52) U.S. Cl.
CPC .............. *A45B 3/00* (2013.01); *A63C 11/228* (2013.01); *G01C 9/00* (2013.01); *G01C 9/02* (2013.01); *G01C 9/12* (2013.01)

(58) Field of Classification Search
CPC ..................... G01C 9/02; G01C 9/12
See application file for complete search history.

(56) References Cited

U.S. PATENT DOCUMENTS

| | | | | |
|---|---|---|---|---|
| 1,116,577 A | * | 11/1914 | Dugger | .................. G01C 9/12 33/283 |
| 8,677,639 B2 | | 3/2014 | Neubauer et al. | |

OTHER PUBLICATIONS

P. Higgins, http://paleopix.com/blog/2014/07/08/field-gear-what-i-need-for-measuring-section/, Jul. 2014.*
Robana "Ski Pole Inclinometer" http://www.instructables.com/id/Ski-Pole-Inclinometer-1/ retreived Apr. 17, 2015 as "ski-pole-inclinometer_Robanna_2015-04-17.pdf" (2 pages).
Emilio Trampuz "Ski Pole Inclinometers" http://mthigh.org/Articles/Inclinometers.htm retreived Apr. 14, 2015 as "ski-pole-inclinometers_Trampuz_2015-04-14.pdf" (2 pages).
(Continued)

*Primary Examiner* — Charlie Y Peng

(57) ABSTRACT

One embodiment of an inclinometer is disclosed comprising lines on a sticker applied to a ski pole shaft. Each line represents a unique slope angle, and may be identified by a number to indicate the slope angle, such that the lines can be used to visually identify slope angle when the ski pole shaft is held vertically. Slope angle measurements can be taken by sighting a side profile of the slope, or by sighting up or down the slope, or by direct contact measurement with the slope. Other embodiments are described and shown, including one with lines printed directly onto a ski pole shaft, and one that's applied to the cylindrical surface of a water bottle rather than to that of a ski pole shaft.

20 Claims, 10 Drawing Sheets

Fig.3A

(56) References Cited

OTHER PUBLICATIONS

Backcountry Access "BCA Slope Meter product page" https://bcaccess.com/product_detail.php?productID=137362 retreived Apr. 23, 2015 as "BCA-Slope-Meter_2015-04-23.pdf" (1 page).
Pieps GMBH "Pieps 30° Plus product page" http://www.pieps.com/en/product/pieps-30degplus retreived Apr. 23, 2015 as "Pieps-30deg-plus_2015-04-23.pdf" (2 pages).
Suunto "Mirror Compases User Guide" http://ns.suunto.com/Manuals/MC-2/Userguides/SUUNTO_MIRRORCOMPASSES_UG_EN.pdf retreived Apr. 23, 2015 as "SUUNTO_MC.pdf" (8 pages).
Suunto "Precision Instruments User Guide" http://ns.suunto.com/Manuals/PM-5/Userguides/SUUNTO_PrecisionInstruments_QG_EN.pdf retreived Apr. 23, 2015 as "SUUNTO_PI.pdf" (13 pages).
Grayson King, "PoleClinometer Math", first published Oct. 2, 2015 on PoleClinometer.com website (specifically at http://poleclinometer.com/math), captured here as 3 PDF pages.

* cited by examiner

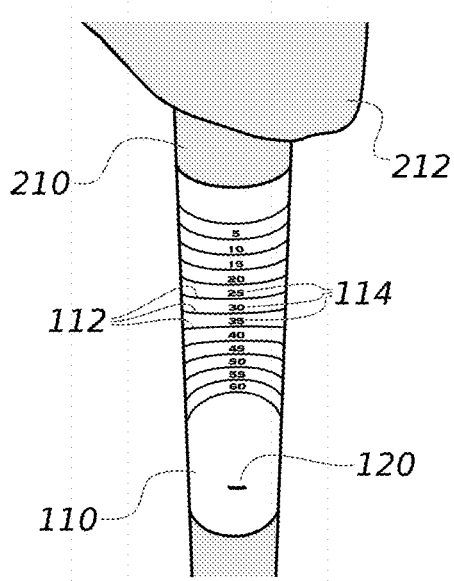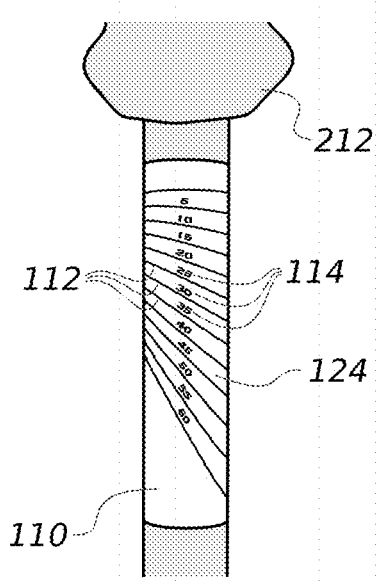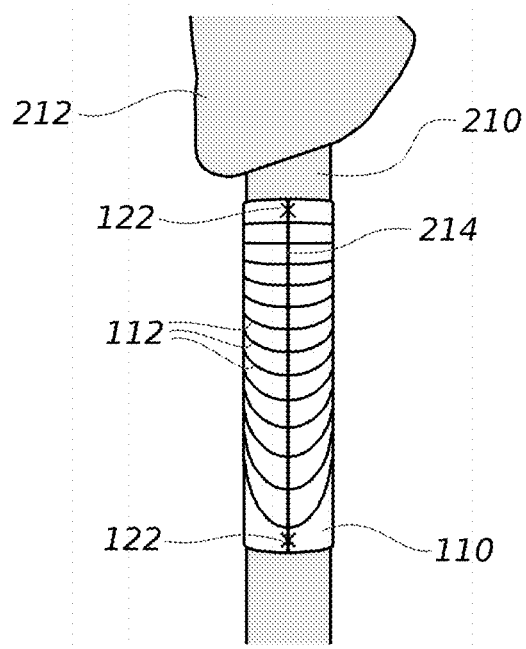

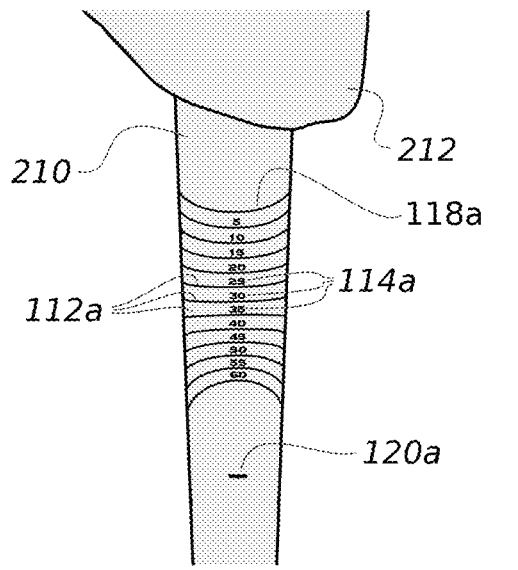
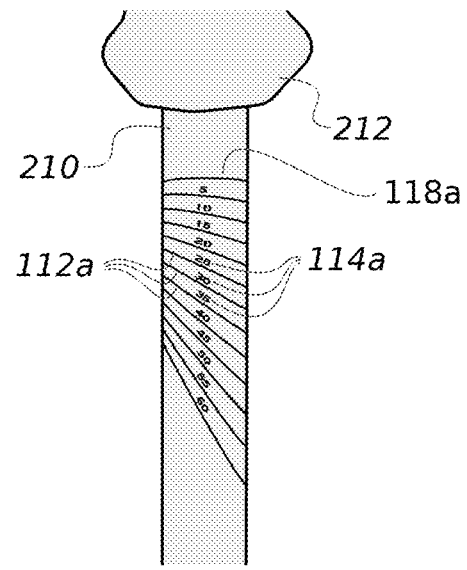
Fig.7A　　　Fig.7B
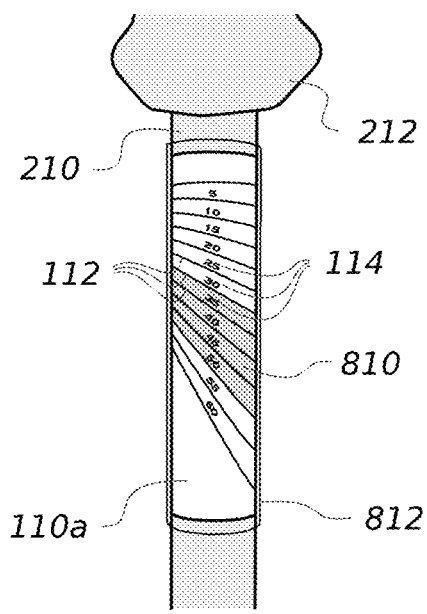
Fig.8

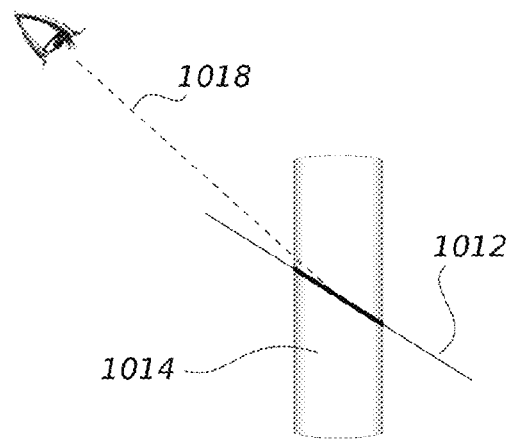
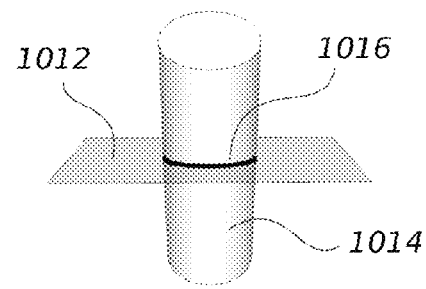
Fig.10A  Fig.10B
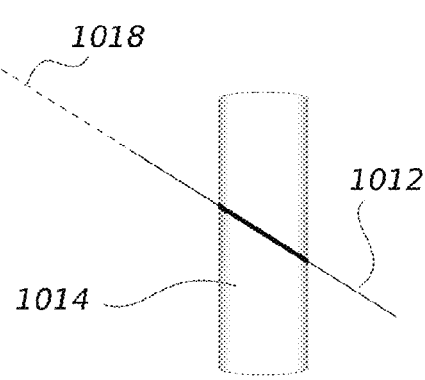
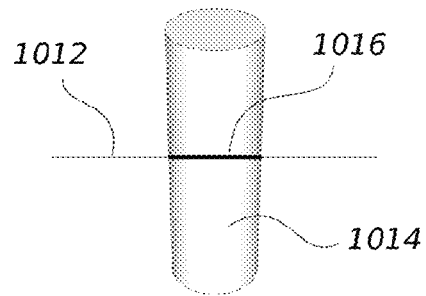
Fig.10C  Fig.10D
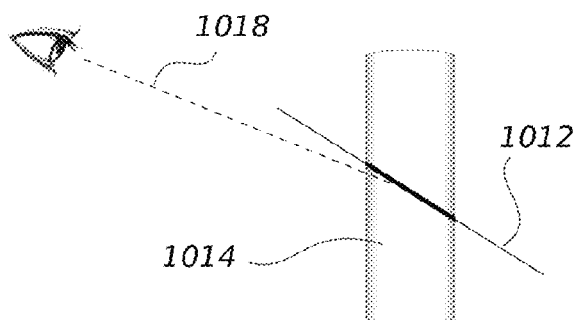
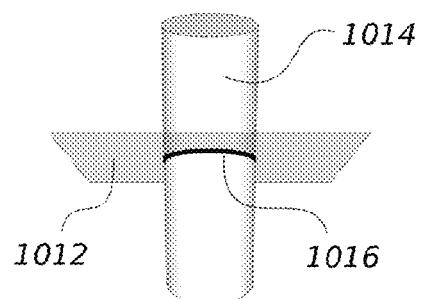
Fig.10E  Fig.10F

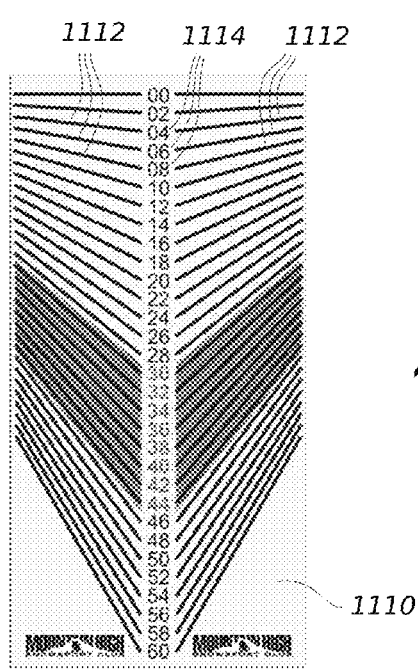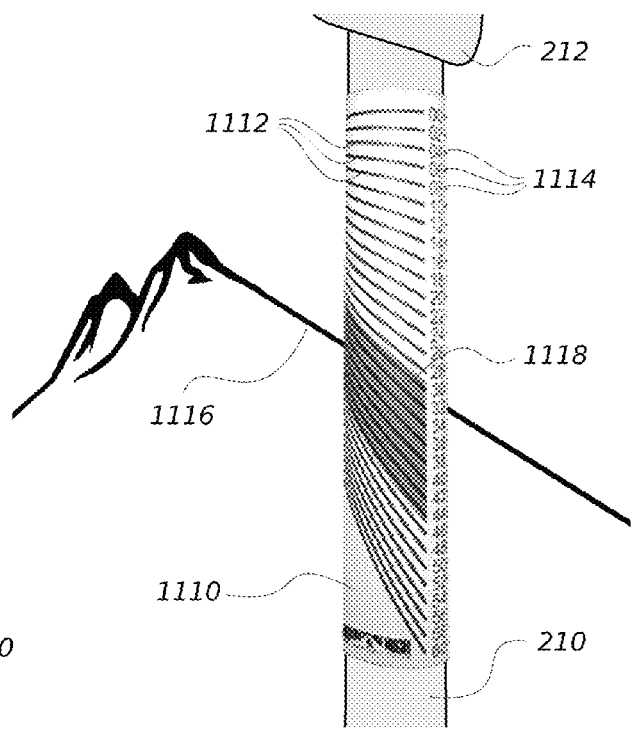
Fig.11A
(PRIOR ART)
Fig.11B
(PRIOR ART)

SKI POLE SHAFT INCLINOMETER AS STICKER OR IMAGE

CROSS-REFERENCE TO RELATED APPLICATIONS

This application claims the benefit of PPA Ser. No. 61/983,959, filed Apr. 24, 2014 by the present inventor, which is incorporated by reference.

BACKGROUND

This invention generally relates to inclinometers, especially to those used in backcountry skiing and snow science.

An inclinometer (aka clinometer, declinometer, slope meter, tilt meter, slope gauge, gradiometer, etc) is an instrument for measuring the angle of an object (or the angle between two points) with respect to gravity, or with respect to a horizontal plane. The inclination reading (or declination, slope angle, etc) is typically given in degrees from horizontal.

Inclinometers are used in a wide range of applications. In backcountry skiing and snow science in particular, inclinometers are commonly used to measure the angle of a snow-covered slope as an aid in assessing risk of avalanche. Avalanches tend to occur only within a certain range of slope angles, and estimating slope angle by eye (without an inclinometer) is difficult even for experienced backcountry skiers, so inclinometers are a valuable tool to those traveling in avalanche terrain.

Some forms of inclinometer work best by viewing the profile of a remote slope from the side in order to measure its angle ("sighting from the side" or "across" a slope), others work best when standing at the top or bottom of a slope and sighting up or down it to measure its angle ("sighting up or down"), and still others work best when used in direct contact with the slope being measured ("contact measurement"). Each of these use modes has unique benefits in different situations in backcountry skiing, but few models of existing inclinometer support all these use modes.

The types of inclinometer commonly used for backcountry skiing typically fall into the following categories:

(a) "Hand-held card" type (eg. BCA Slope Meter, per "BCA Slope Meter product page" in information disclosure): These work best for contact measurements and for sighting across a slope from the side. They are difficult to impossible to use for sighting up or down a slope.

(b) "Hand-held with mirror" type (eg. Suunto MC-2, per "Mirror Compases User Guide" in information disclosure): These are similar to the hand-held card type in function, but also include a mirror to facilitate sighting up or down a slope. These are typically sold as a compass with inclinometer feature. Though the mirror allows these to be used for sighting up or down a slope, the process of measuring slope angle in this way is somewhat tricky to master in practice.

(c) "Forestry" type (eg. Suunto PM-5, per "Precision Instruments User Guide" in information disclosure): These are highly accurate, but relatively bulky and heavy, and are very expensive. For measuring slope angle, they work best and most accurately when sighting up or down a slope.

(d) "Ski-pole-integrated" type (eg. K2 LockJaw series poles, per U.S. Pat. No. 8,677,639): These are similar in function to the hand-held card type, but are integrated into a ski pole. They have the advantage of being easily accessible when skiing (because ski poles are always in your hands). However, the only existing models (the K2 LockJaw series) can only feasibly be used for contact measurements. They are difficult to impossible to use for measuring slope angle by sighting up, down, or across a slope. The scale on these particular models also has a very limited measurement range, and is notoriously difficult to read.

(e) "Electronic" type (eg. Pieps 30° Plus, per "Pieps 30° Plus product page" in information disclosure): These are quite accurate but very expensive. They work best for contact measurements and for sighting from the side. They require batteries that have to be replaced when they run low. The Pieps 30° Plus model is designed to be attached to a ski pole for the advantage of easy access, but in practice it is somewhat bulky and cumbersome on the pole shaft.

More recently, a new type of ski pole inclinometer was proposed in the public domain, by two seemingly independent sources, as described below.

(f) "Straight-lined-sticker" type ski pole inclinometer (eg. Robana & Trampuz in information disclosure): I'll refer to these herein as "SLS" type inclinometers. An example of these is shown in FIG. 11. It comprises a sticker 1110 with straight lines 1112 printed on it and numbers 1114 identifying the angle of each line. When wrapped around a ski pole shaft 210 just below the pole's grip 212 as shown in FIG. 11B, this SLS type inclinometer is intended to allow measurement of slope angle when sighting across a slope. To do so the user holds the pole vertically with the profile of the slope to be measured 1116 in the background, and then looks for the line or lines 1112 on the sticker that appear to most closely match the profile of the slope being measured 1116. These SLS type ski pole inclinometers suffer from a significant oversight in geometry. When the sticker is wrapped around a pole shaft, a 2D projection (i.e. what's seen by the user, as illustrated in FIG. 11B) shows lines that are no longer straight, and do NOT accurately represent the same angles as the straight lines on the flat sticker. The end result is that these straight-lined-sticker type ski pole inclinometers are grossly inaccurate. In the example of FIG. 11B, the angle of the slope in the background 1116 is 32°, which clearly does not match the line marked "32" in the sticker image 1118. Using this particular SLS inclinometer, one might easily mis-measure the slope angle as 26° or so.

Another disadvantage of this type of inclinometer is that it is intended for measuring slope angles by sighting across the slope only, and cannot be used for sighting up or down a slope to measure its inclination.

Disclosed herein are embodiments of an apparatus that provide advantages over prior inclinometers.

SUMMARY

In accordance with one embodiment, an inclinometer comprises lines on a sticker applied to a ski pole shaft, such that the lines can be used to visually measure slope angle.

DRAWINGS—FIGURES

FIGS. 2A to 2C show the inclinometer sticker of FIG. 1 wrapped around a ski pole shaft as viewed from three different angles.

FIGS. 7A & 7B show two views of an alternative embodiment where lines are printed directly onto a ski pole shaft.

FIG. 8 shows an alternative embodiment of inclinometer sticker incorporating color coding and a clear protective layer.

Figure 1:
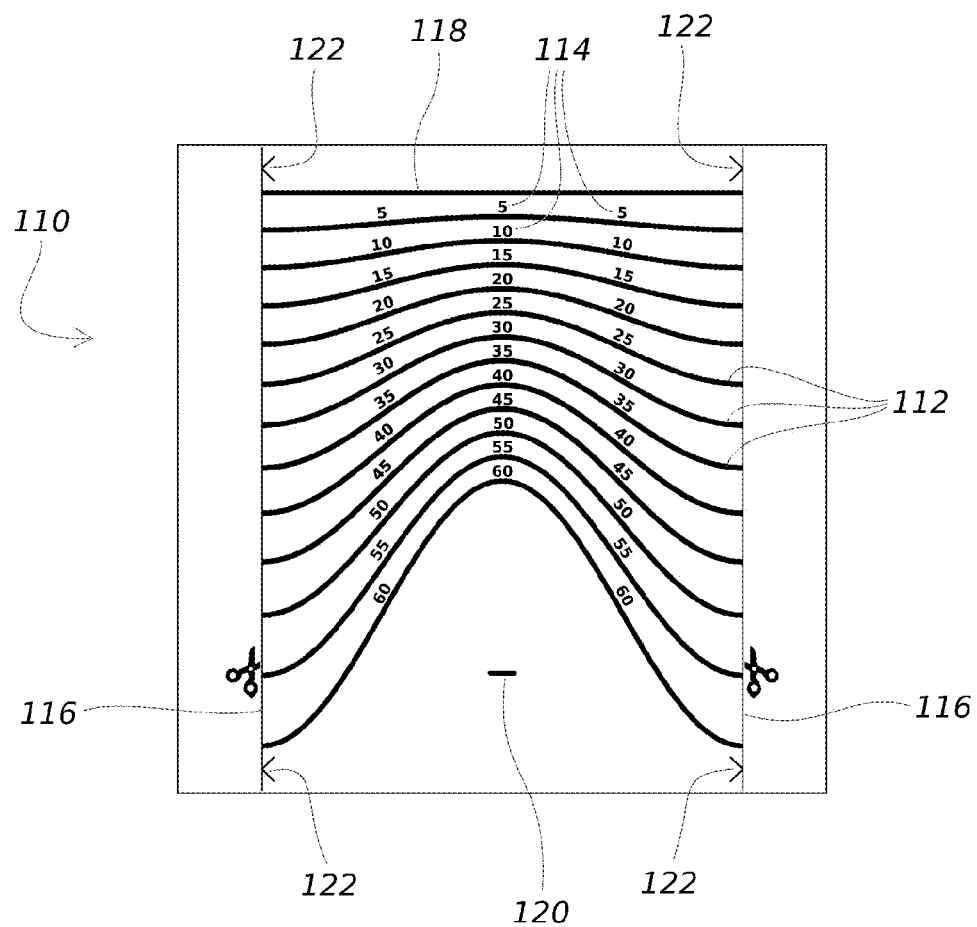
FIG. 1 shows an inclinometer sticker in accordance with one embodiment.

FIG. 10A to 10F graphically illustrate some principles of operation.

FIG. 11A (PRIOR ART) shows a prior "straight-lined-sticker" type ski pole inclinometer.

FIG. 11B (PRIOR ART) illustrates the use of a prior "straight-lined-sticker" type ski pole inclinometer, highlighting its inaccuracy.

DRAWINGS—REFERENCE NUMERALS 110 inclinometer sticker
112 lines printed on sticker
112a lines printed directly onto ski pole shaft
114 numbers printed on sticker
114a numbers printed directly onto ski pole shaft
116 vertical cut lines
118 horizontal reference line printed onto sticker
118a horizontal reference line printed directly onto ski pole shaft
120 scale reference mark printed onto sticker
120a scale reference mark printed directly onto ski pole shaft
122 fit reference marks
210 ski pole shaft
212 ski pole grip
214 seam between cut edges of sticker
310 skier
312 ski pole
314 slope to be measured
318 line-of-sight
410 convexity in slope topography
510 reference object
512 reference point
514 reference line
610 surface of snow
612 small hole dug in snow
614 string
616 small weight
810 shading or color coding
812 clear protective layer
910 water bottle with cylindrical body
912 string or tab to facilitate holding so body can hang vertically
1012 plane
1014 cylindrical surface
1016 line at intersection of plane and cylinder
1018 line-of-sight
1110 straight-lined sticker
1112 straight lines printed on sticker
1114 numbers printed on sticker
1116 side profile of a 32° slope
1118 line on sticker intended to represent 32°

DETAILED DESCRIPTION

A first embodiment of my inclinometer is illustrated in FIGS. 1 and 2. A sticker 110 is applied to a cylindrical section of ski pole shaft 210 just below the bottom of the ski pole's grip 212 per FIG. 2A to 2C (showing three different views). The sticker 110 has an image printed on it (per FIG. 1) that includes lines 112 and numbers 114 representing different slope angles. Also included on the sticker image are vertical cut lines 116 to indicate where the sticker is to be cut before applying it to the ski pole shaft. Each line 112 traces the approximate path of intersection between the cylindrical surface of the pole shaft 210 and a hypothetical plane at a specified angle ($\Phi$) to the axis of the pole shaft. The "slope angle" ($\theta$) represented by each line is simply $\theta = 90° - \Phi$. The shape of each line 112 on the flat sticker 110 (i.e. before applying the sticker to the ski pole shaft 210) is defined by Eq.1 below:

$$y = A + \frac{C\tan\theta}{2\pi}\left[\cos\left(\frac{2\pi x}{C}\right) - 1\right] \qquad \text{Eq. 1}$$

where:
C is the circumference of the ski pole shaft 210,
$\theta$ is the slope angle specific to each line 112,
A is an arbitrary offset specific to each line 112 to prevent the lines from intersecting.

Note that x, y, C, and A can be expressed in any unit of length (inches, mm, etc), so long as all are expressed in the same unit of length.

Each line 112 is plotted over the range x=−C/2 to x=+C/2 to span the distance between the two vertical cut lines 116. Thus the distance between the two vertical cut lines 116 is equal to the circumference (C) of the pole shaft.

The first embodiment represented in FIGS. 1 and 2 includes a total of thirteen lines with values of $\theta$ and A shown in Table 1 below to allow measurement of slope angles form 0° to 60° in inclination.

TABLE 1

| $\theta$ (degrees) | $\theta$ (radians) | A |
|---|---|---|
| 0° | 0 | 0 |
| 5° | $\pi/36$ | $-0.05 \times C$ |
| 10° | $\pi/18$ | $-0.10 \times C$ |
| 15° | $\pi/12$ | $-0.15 \times C$ |
| 20° | $\pi/9$ | $-0.20 \times C$ |
| 25° | $5\pi/36$ | $-0.25 \times C$ |
| 30° | $\pi/6$ | $-0.30 \times C$ |
| 35° | $7\pi/36$ | $-0.35 \times C$ |
| 40° | $2\pi/9$ | $-0.40 \times C$ |
| 45° | $\pi/4$ | $-0.45 \times C$ |
| 50° | $5\pi/18$ | $-0.50 \times C$ |
| 55° | $11\pi/36$ | $-0.55 \times C$ |
| 60° | $\pi/3$ | $-0.60 \times C$ |

This first embodiment also includes a scale reference mark 120 to aid in ensuring that the sticker image is printed accurately. The distance between the scale reference mark 120 and a horizontal reference line 118 is equal to the distance between the vertical cut lines 116, which is equal to the circumference of the pole shaft per above.

This first embodiment also includes fit reference marks 122 to aid in ensuring that the sticker is the proper size to fit the ski pole. When applied to a ski pole shaft with correct fit, the fit reference marks 122 will approximately form an "X" shape at the points where the edges of the sticker meet 214 as shown in FIG. 2C.

The sticker 110 in this first embodiment is waterproof and UV-resistant vinyl of the type commonly used for bumper stickers. The sticker 110 is custom-printed with an image of the lines 112, numbers 114, etc described above.

Operation

Use of the inclinometer embodiment described above is illustrated in FIGS. 3 to 6 showing multiple different methods of use, or modes of operation.

Figure 3A:
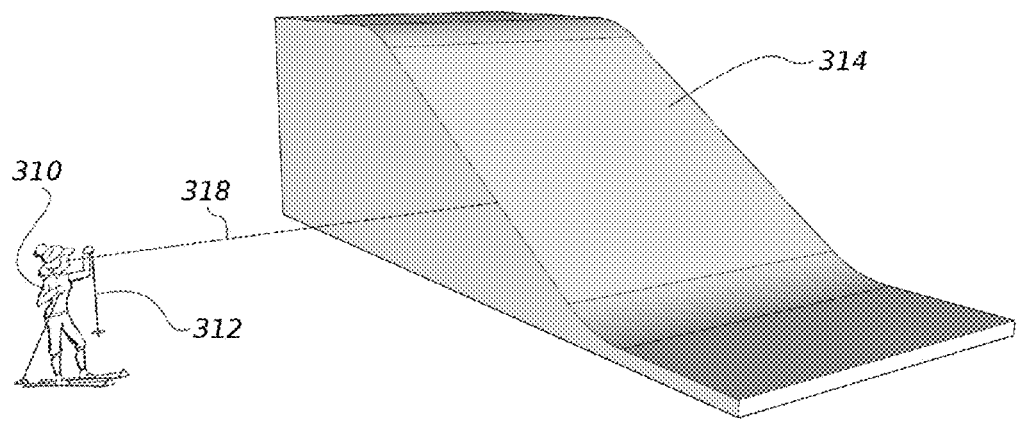
FIGS. 3A & 3B illustrate the use of an inclinometer sticker for measuring slope angle "sighting from the side" in accordance with certain embodiments.
Figure 3B:
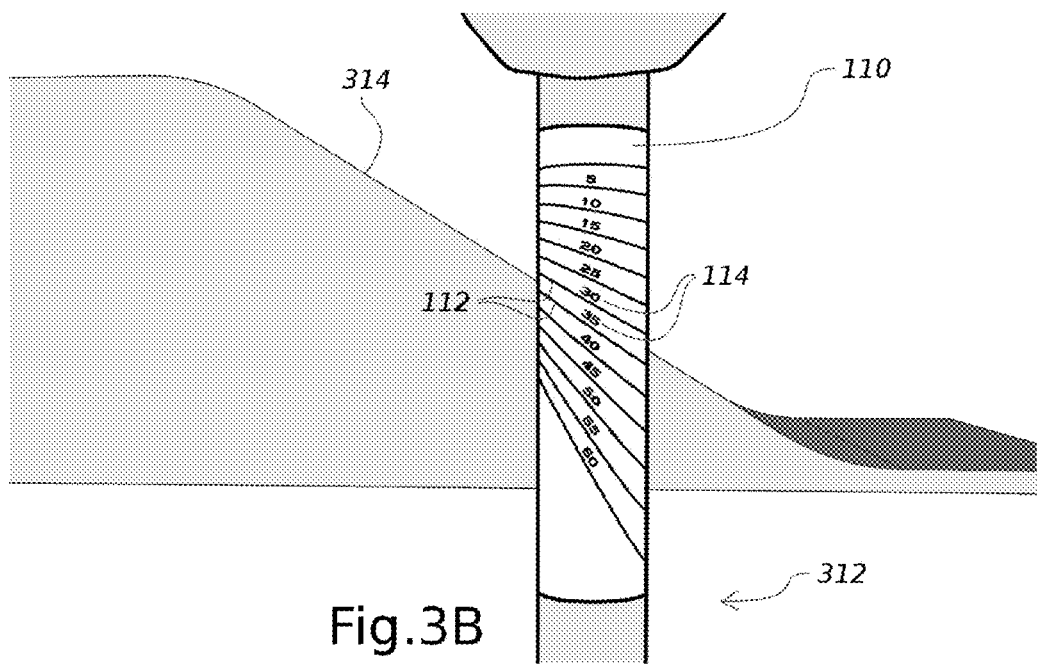

When "sighting across a slope" (i.e. viewing the profile of a remote slope from the side) as illustrated in FIG. 3A, a skier 310 positions herself such that her line-of-sight 318 is across the face of a slope 314 viewed from its side. She then holds a ski pole 312 lightly from the top of its grip in such a way that it hangs approximately vertically (the ski pole itself provides the vertical reference via gravity, essentially like a plumb-bob), and then sights across the slope of interest 314 and places the inclinometer sticker 110 directly in her line-of-sight 318 oriented such that the lines 112 are sloping generally in the same direction as the slope of interest 314. The view seen by the skier 310 of FIG. 3A is represented in FIG. 3B as if from her perspective. She then moves the pole 312 around slightly (still gripping it lightly from the top of its grip so it remains approximately vertical) until the slope of interest 314 is, from her perspective, directly behind the line or lines 112 that appear to most closely match the slope's angle. She then reads the number or numbers 114 that correspond to that line or lines to get a reading of slope angle. In the case of the FIG. 3 example, the angle of the slope 314 visually appears to be almost directly between that of the lines marked "30" and "35", so the measured slope angle is approximately 32° or 33° (i.e. about mid way between 30° and 35°).

Figure 4A:
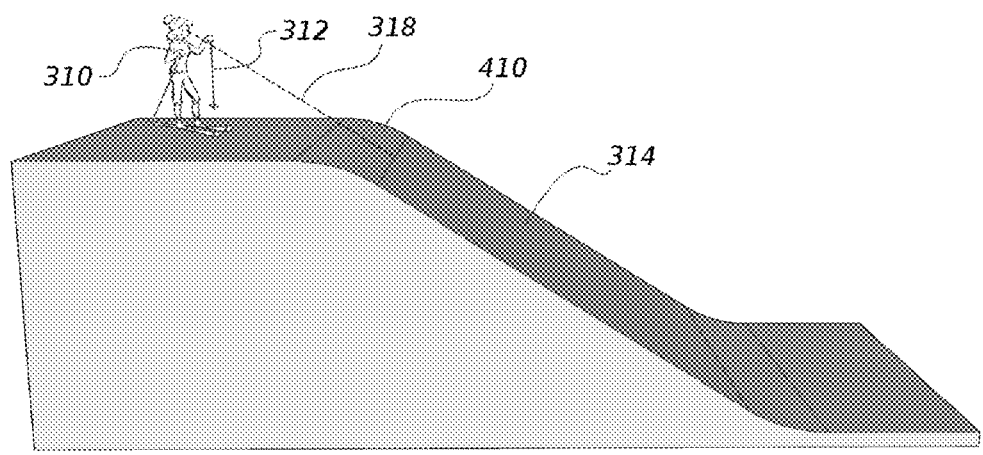
FIGS. 4A & 4B illustrate the use of an inclinometer sticker for measuring slope angle "sighting down the slope" in accordance with certain embodiments.
Figure 4B:
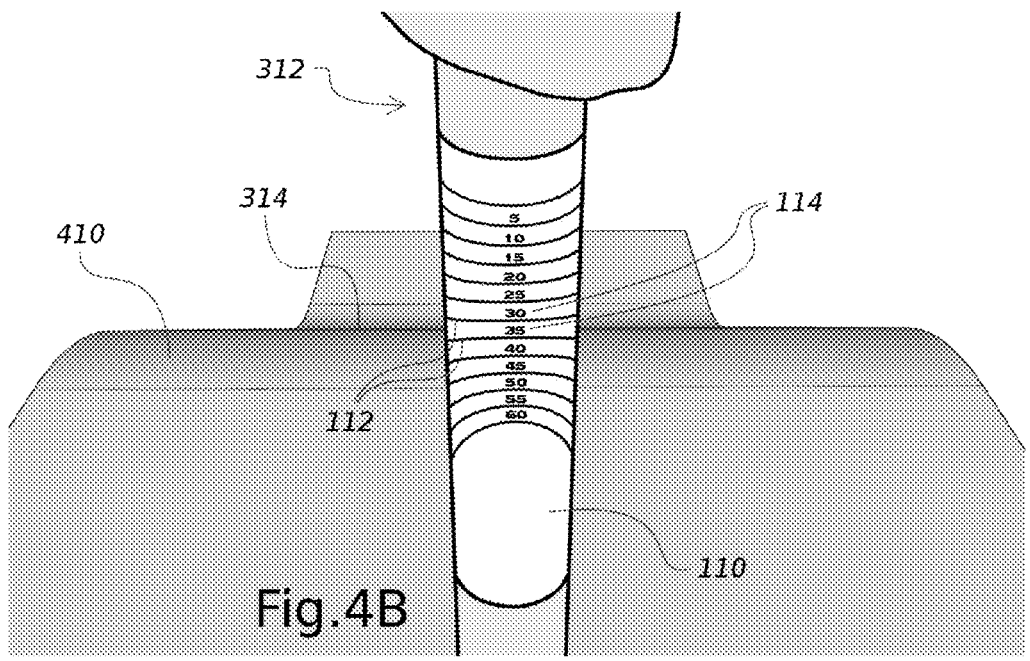

When "sighting down a slope" (i.e. standing on or at the top of a slope, looking down it to measure its inclination) as illustrated in FIG. 4A, a skier 310 stands at the top of a slope, or behind a convexity 410 in the slope, and positions herself such that her line-of-sight 318 is right down the surface of the slope to be measured (i.e. as if her projected line-of-sight were a laser beam skimming right along the surface of the slope such that the angle of her line-of-sight matches the angle of the slope). She then holds a ski pole 312 lightly from the top of its grip in such a way that it hangs approximately vertically (the ski pole itself provides the vertical reference via gravity, essentially like a plumb-bob), and then sights down the slope of interest 314 and places the inclinometer sticker 110 directly in her line-of-sight 318 oriented such that the lines 112 are sloping generally in the same direction as the slope of interest 314. The view seen by the skier 310 of FIG. 4A is represented in FIG. 4B as if from her perspective. She then moves the pole 312 around slightly (still gripping it lightly from the top of its grip so it remains approximately vertical) until the slope of interest 314 is directly behind the line or lines 112 that appear least curved from her perspective. She then reads the number or numbers 114 that correspond to that line or lines to get a reading of slope angle. In the case of the FIG. 4 example, the line marked "30" appears to be curving very slightly up and the line marked "35" appears to be curving very slightly down, to an approximately equal degree, so the measured slope angle is approximately 32° or 33° (i.e. about mid way between 30° and 350°).

Figure 5A:
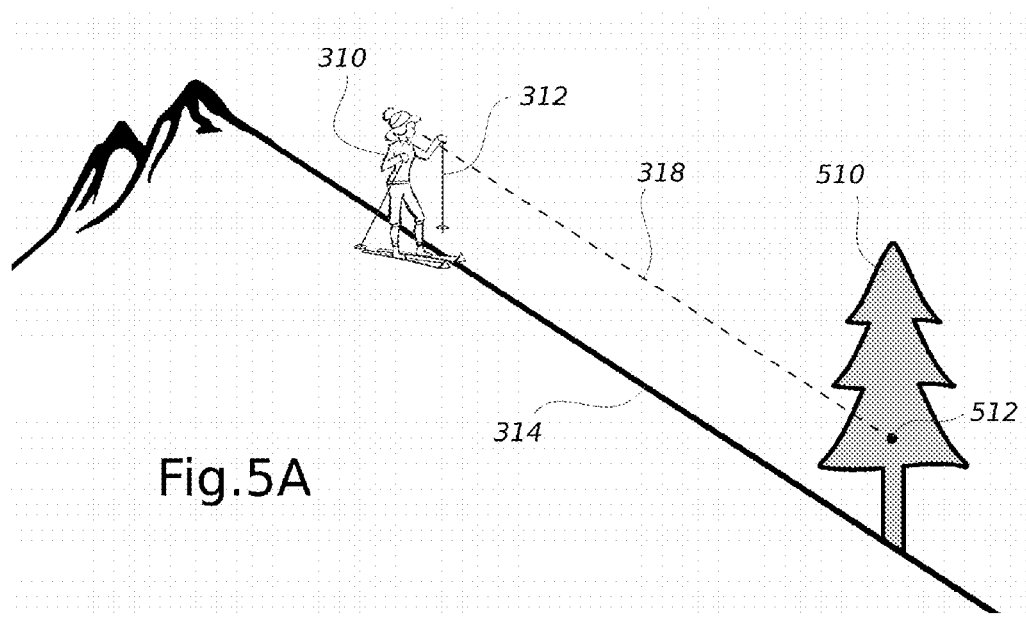
FIGS. 5A & 5B illustrate the use of an inclinometer sticker for measuring slope angle "sighting down the slope" by an alternative method in accordance with certain embodiments.
Figure 5B:
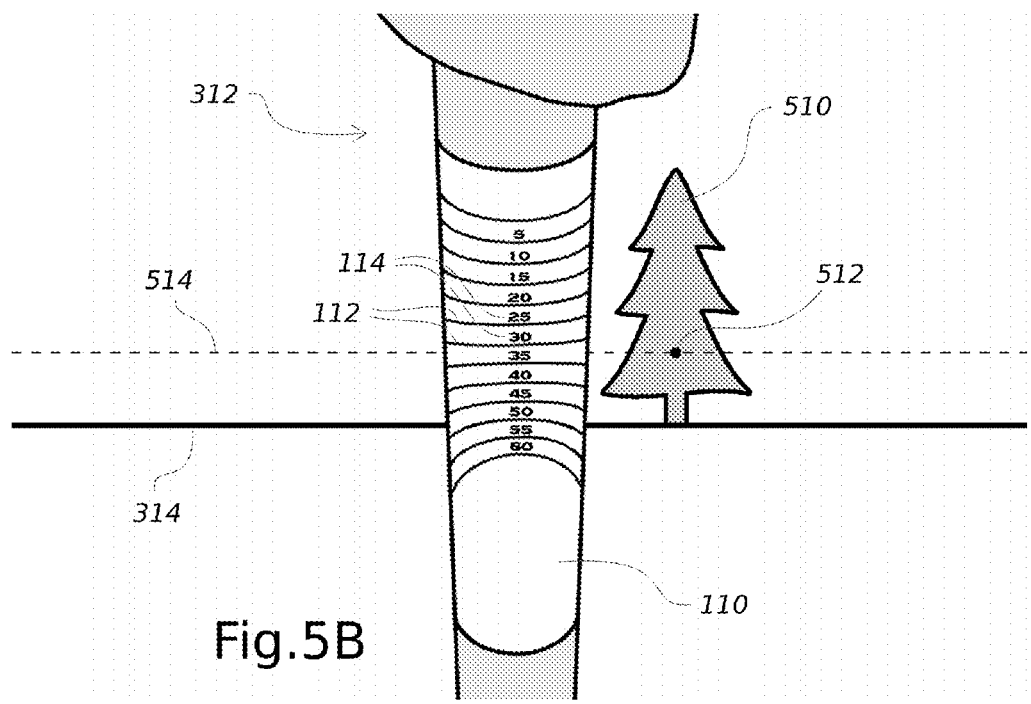

Alternatively, when "sighting down a slope" (i.e. standing on or at the top of a slope, looking down it to measure its inclination) as illustrated in FIG. 5A, a skier 310 stands on the surface of the slope to be measured 314 (specifically on a portion to be measured, and NOT behind a convexity), then selects a person or object 510 farther down the slope from her position, then pictures an imaginary reference point 512 on that object that approximately represents her own height (as if she were standing next to the object). She then holds a ski pole 312 lightly from the top of its grip in such a way that it hangs approximately vertically (the ski pole itself provides the vertical reference via gravity, essentially like a plumb-bob), and then sights down the slope of interest 314 and places the inclinometer sticker 110 directly in her line-of-sight 318 oriented such that the lines 112 are sloping generally in the same direction as the slope of interest 314. The view seen by the skier 310 of FIG. 5A is represented in FIG. 5B as if from her perspective. She then pictures an imaginary reference line 514 across the slope at the same height as the reference point 512, and then moves the pole 312 around slightly (still gripping it lightly from the top of its grip so it remains approximately vertical) until the imaginary reference line 514 is directly behind the line or lines 112 that appear least curved from her perspective. She then reads the number or numbers 114 that correspond to that line or lines to get a reading of slope angle. In the case of the FIG. 5 example, the line marked "30" appears to be curving very slightly up and the line marked "35" appears to be curving very slightly down, to an approximately equal degree, so the measured slope angle is approximately 32° or 33° (i.e. about mid way between 30° and 35°). Note that this specific method can be used just as easily to sight UP a slope to measure its inclination.

Figure 6:
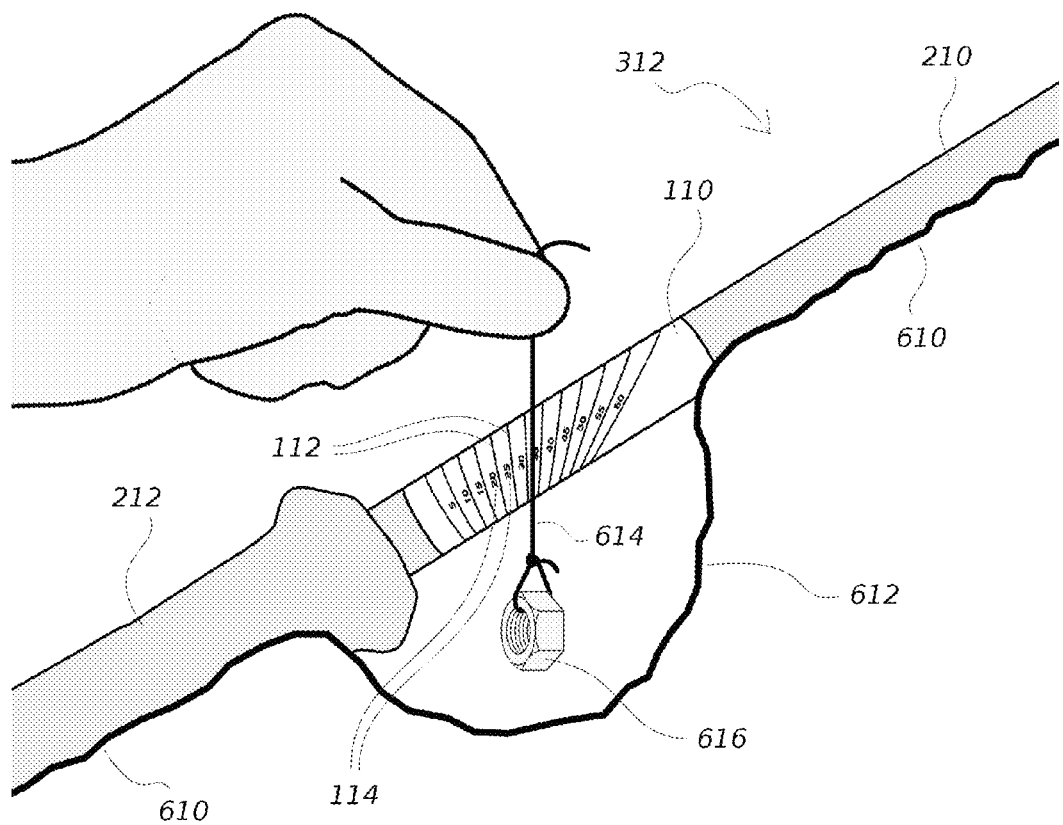
FIG. 6 illustrates the use of an inclinometer sticker for measuring slope angle by "contact measurement" in accordance with certain embodiments.

When performing "contact measurement" of slope angle on a snow-covered slope (i.e. measuring inclination of a very local area of slope by placing measurement equipment in direct contact with the slope surface) as illustrated in FIG. 6, a skier digs a small hole 612 in the snow and places her ski pole 312 on the surface of the snow 610 such that the pole grip 212 points generally uphill or downhill, the pole shaft 210 rests approximately evenly on the surface of the snow, and the lines 112 on the inclinometer sticker 110 are over the hole 612 and are sloping in a generally vertical direction. She then holds a string 614, with a small weight 616 attached to its end, near the inclinometer sticker 110 in order to determine which line or lines 112 are most nearly vertical (as indicated by most closely matching the angle of the string). She then reads the number or numbers 114 that correspond to that line or lines to get a reading of slope angle. In the case of the FIG. 6 example, the angle of the string visually appears to be almost directly between that of the lines marked "30" and "35", so the measured slope angle is approximately 32° or 33° (i.e. about mid way between 30° and 35°.)

Alternative Embodiments

Several alternative embodiments are described below.

In a "direct printed" embodiment (FIG. 7), lines 112a and numbers 114a are printed directly onto the surface of the ski pole shaft 210 just below the pole's grip 212. Also included is a scale reference mark 120a and horizontal reference line 118a to aid in ensuring the image of the lines is printed accurately. These are the same as the lines 112, numbers 114, and reference mark 120 of the first embodiment except that rather than being printed onto a sticker 110, they are instead printed directly onto the pole shaft 210. This has potential advantages of being even lower cost than the sticker form, and being easier for the ski pole manufacturer to integrate into their product.

In a "non-cylindrical" embodiment, modified versions of the lines 112 and numbers 114 of the first embodiment are applied (by direct printing or by sticker) to a non-cylindrical pole shaft. Herein the terms "cylinder" or "cylindrical", when used without a qualifier, refer to a right-circular-cylinder shape. For the purposes of this application, I'll define the terms "near-cylinder" and "near-cylindrical" to include any generalized cylinder or generalized cone or approximately similar shapes. Some ski pole shafts have non-cylindrical shapes, such as those with elliptical or teardrop cross-sectional shapes, or those with significant taper in the upper section. All these ski pole shafts are still "near-cylindrical" in shape per my above definition. Provided the shape of any "near-cylindrical" pole shaft is known, modified versions of the lines 112 of the first embodiment can be adapted to fit such shape to ensure that each line traces the approximate path of intersection between the surface of the pole shaft and a hypothetical plane at a given angle to the axis of the pole shaft.

In a "color-coded" and "protected" embodiment (FIG. 8), a modified sticker 110a includes the same lines 112 and numbers 114 as the first embodiment, but also includes shading or color coding 810 to identify which slope angles are most prone (eg. red) or least prone (eg. green) to avalanche etc. The sticker 110a is applied to a ski pole shaft 210 just below the pole's grip 212 the same as in the first embodiment. The sticker 110a is then covered by a clear protective layer 812. For example, clear resilient heat-shrink-tubing could be applied over the sticker or image to protect it from physical damage. Alternatively, a clear liquid epoxy paint or similar could be applied over the sticker or image. The color coding 810 provides the potential advantage of being even quicker and more intuitive for the user to get a fast "on the fly" read of whether a slope is prone to avalanche or not. For certain applications, the numbers 114 may not even be necessary if the color coding 810 is sufficient for the intended usage. The clear protective layer 812 has the potential advantage of improving the durability and useful lifespan of the inclinometer.

Figures 9A, 9B:
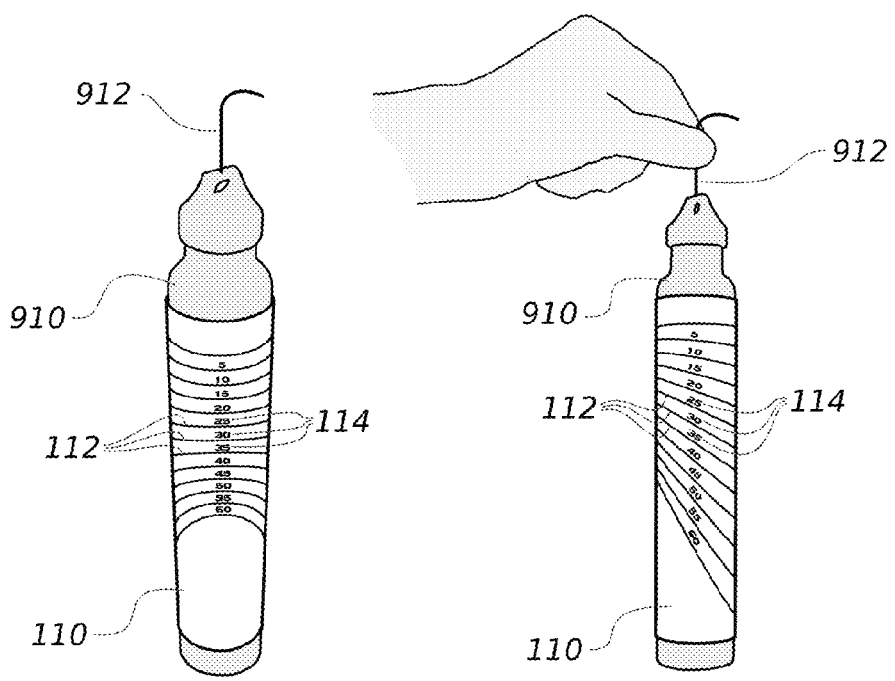
FIGS. 9A & 9B show an alternative embodiment of inclinometer sticker on a water bottle.

In a "non-ski-pole" embodiment, the lines 112 and numbers 114 of the first embodiment are applied (by direct printing or by sticker) to the cylindrical or near-cylindrical surface of an object other than a ski pole. The object in this case should be something that is easily hand-held, and that can be held in such a way as to ensure that the axis of its near-cylindrical surface is approximately vertical when being used as an inclinometer. Long and narrow objects tend to be well suited because they can be more easily suspended in such a way that they hang vertically. An example shown in FIG. 9 is a cylindrical water bottle 910. This specific embodiment features a string 912 attached to the axial center of the bottle's cap to support holding in such a way that it hangs more perfectly vertically than could be achieved without the string. The sticker 110, lines 112, and numbers 114 in the specific embodiment of FIG. 9 are the same as in the first embodiment, only scaled to fit the diameter of the water bottle. The best objects for this are ones that a user would carry anyway for a purpose other than the inclinometer function (eg. a hiking stick carried for balance, or a water bottle carried for liquid consumption), so as to achieve advantages (d) and (e) in the Advantages section below.

Advantages

From the descriptions above, a number of advantages of some embodiments of my inclinometer become evident.

Compared to prior "straight-lined-sticker" type inclinometers (per background section, herein referred to as "SLS type" inclinometers), certain embodiments of my inclinometer offer the following advantages:

(a) Much Better Accuracy: SLS type ski pole inclinometers are inherently inaccurate for reasons described in the "Background of the Invention" section herein. Some embodiments of my inclinometer allow for much greater accuracy by accounting for the shape of the object to which the inclinometer sticker (or image) is applied.

(b) Useable for Sighting Up or Down a Slope: SLS type ski pole inclinometers are intended only for measuring slope angle by sighting across a slope from its side; they cannot be used for measuring slope angle by slighting up or down a slope. Some embodiments of my inclinometer are not subject to this limitation; they can be used to measure slope angle by sighting up or down a slope, or by sighting across a slope, or by measuring via direct contact with a slope.

Compared to all prior forms of inclinometer except for the SLS type, certain embodiments of my inclinometer offer the following advantages:

(c) Lower Cost: As a simple sticker, or as an image printed directly onto the shaft of a ski pole or other object, some embodiments of my inclinometer have the potential to be far less costly to produce than all prior inclinometer implementations (other than the inherently flawed SLS type).

(d) Lighter Weight: Some embodiments of my inclinometer add essentially zero additional mass (eg. negligible addition to overall weight of existing ski pole) when applied to an object the user carries anyway. This is of significant benefit in weight-sensitive sports like backcountry skiing, hiking, etc. No prior inclinometer (other than the inherently flawed SLS type) is as light weight as some embodiments of mine are when applied to an object that the user carries anyway.

(e) Smaller/Lower Bulk: Some embodiments of my inclinometer add essentially zero additional size (eg. negligible addition to overall dimensions of existing ski pole), and do not form an additional item to be carried (nothing to take up pocket space etc), when applied to an object the user carries anyway. This is of significant benefit in minimalist sports like backcountry skiing, hiking, etc. No prior inclinometer (other than the inherently flawed SLS type) is as small or low-bulk as some embodiments of mine are when applied to an object that the user carries anyway.

(f) Less Complex and therefore arguably More Reliable: Some embodiments of my inclinometer have no moving parts and no batteries; there is essentially nothing to break. All prior inclinometers (other than the inherently flawed SLS type) involve moving parts or electronics of some kind, and so are, in theory, more prone to failure. The electronic types require batteries that must be replaced periodically.

(g) Useable In All Modes: Some embodiments of my inclinometer can be used for all three basic modes of operation described herein: Sighting up or down a slope, sighting across a slope, and contact measurement. Few prior inclinometers offer this level of flexibility, and those that do are significantly more expensive and heavier than some embodiments of my inclinometer. In backcountry skiing, different situations require different methods of measuring slope angle, and an inclinometer with the flexibility to be used in all the basic use modes is beneficial.

(g) Easy to Use for all "Line-of-Sight" measurements: Most prior inclinometers can be easily used for sighting up or down a slope, OR for sighting across a slope, but those that support both of these modes tend to be difficult to operate and/or less accurate in one or the other of these basic use modes. Some embodiments of my inclinometer are very easy to use both for sighting up or down a slope, AND for sighting across a slope, and provide similar accuracy in both these modes.

(h) Easier to Access than non-pole-mounted units: Skiers and many other snow travelers generally have ski poles in their hands essentially at all times when traveling in snowy terrain, and accessing some embodiments of my inclinometer is far quicker for those users than digging into a backpack, or even a pocket, for any prior non-pole-mounted inclinometer. This ease of access is a significant benefit when traveling light and fast in backcountry terrain, especially in that a user is far less likely to take frequent slope angle measurements when each measurement involves stopping to fish through pockets or pack to pull out a non-pole-mounted inclinometer. Compared to pocket inclinometers, certain embodiments of my inclinometer are far quicker to access for skiers and many other snow travelers who carry ski poles.

Additional advantages of some supplementary features of my inclinometer include . . . .

(i) The scale reference mark 120 shown in FIGS. 1 and 2 allows the printed scale of the image to be easily checked. Scaling of a printed image can commonly be done wrong such that the image is mis-scaled on the x axis only, or on the y axis only, or on both axes. Just a small error in scaling of the inclinometer image, especially on the y axis, can result in significant inaccuracy in slope angle measurements. An erroneously scaled image can be difficult to identify without taking precise measurements of the final printed image, and so can easily go undetected by the manufacturer and by the end user. The scale reference mark 120 shown in FIGS. 1 and 2 is placed so that its distance from the horizontal reference line 118 is equal to the circumference of the ski pole shaft. Recall that the distance between the two vertical cut lines 116 of FIG. 1 is also equal to the circumference of the ski pole shaft. With these features, the scaling of the printed image on a sticker can easily be checked and compared with the circumference of the ski pole it is intended to be applied to. Similarly, an inclinometer image printed directly onto a ski pole can be checked for vertical scale by measuring the distance between the scale reference mark 120a and the horizontal reference line 118a and comparing against the circumference of the pole shaft.

(j) The fit reference marks 122 shown in FIGS. 1 and 2 allow certain embodiments of my inclinometer to be easily checked for fit when the sticker is applied to a pole shaft. If the wrong size inclinometer sticker is used for a given pole shaft diameter, significant errors in slope angle measurements can result. A size mismatch can sometimes be difficult to detect without features to support fit checking Fit reference features provide benefit to the user by allowing an easy way to verify that the fit is adequate to ensure the best accuracy.

Principle of Operation

To benefit the reader's understanding of some general geometrical concepts behind the design and operation of embodiments of my inclinometer, FIGS. 10A to 10F show graphic representations of the overall functional concept by specific simplified example. In this set of figures, a single plane 1012 bisects a cylinder 1014 at a given angle to the cylinder's axis. A line 1016 around the cylinder tracing the path of intersection with the plane represents the lines 112 in some embodiments of my inclinometer. In the specific case of FIG. 10, the angle between the plane 1012 and the axis of the cylinder 1014 is 60°. So with the cylinder oriented vertically, the plane is exactly 30° from horizontal (i.e. 90°−60°=30°. The right column of FIG. 10 (FIGS. 10B, 10D, 10F) represent views of the plane and cylinder from three slightly different perspectives. The left column of FIG. 10 (FIGS. 10A, 10C, 10E) show a side view illustrating the angle of the "line-of-sight" 1018 represented by each respective view in relation to the angle of the plane 1012. Specifically . . . .

FIG. 10A/10B: viewed from ABOVE the plane; line-of-sight angle> plane angle.

FIG. 10C/10D: viewed from ON the plane; line-of-sight angle=plane angle.

FIG. 10E/10F: viewed from BELOW the plane; line-of-sight angle<plane angle.

Notice how the apparent shape of the line 1016 gives a clear indication of whether the line-of-sight angle is less ("frowning" line shape in FIG. 10F) or more ("smiling" line shape in FIG. 10B) than the angle of the plane. When sighting up or down a slope to measure its inclination (per FIG. 4 or 5 as described previously) the angle of the viewer's line-of-sight matches the angle of the slope being measured. Combine these two concepts, and add multiple lines defined by different plane angles (and so representing different slope angles), and it's easy to see how slope angle can be measured using some embodiments of my inclinometer.

The graphic illustration of FIG. 10 should make it clear why the "lines" in embodiments of my invention are defined by the intersection of a plane with whatever surface the lines are ultimately applied to. The equation for those lines as plotted on a flat sticker before applying to a cylindrical surface (for certain embodiments) is given in Eq.1 in the Detailed Description section. A derivation of that equation is beyond the scope of this patent application, but suffice it to say that it's fairly basic geometry, and a modified form of the equation can be derived for most any well-defined "near-cylindrical" shape. Note that a simplified form of Eq.1 that's "normalized" to a unitless pole shaft circumference of 2 is given by Eq.2 below:

$$y = A + \frac{\tan\theta}{\pi}[\cos(\pi x) - 1] \qquad \text{Eq. 2}$$

where in this case the line(s) must be plotted over the range from x=−1 to x=+1, and the entire resulting image must be scaled (equally in x and y) to achieve the proper size for a given pole shaft circumference. This is included here in an attempt at greater conceptual clarity, and to exemplify the fact that the equation to define the lines of certain embodiments can take more than one form.

CONCLUSION, RAMIFICATIONS, AND SCOPE

Accordingly the reader will see that embodiments of the inclinometer described herein offer significant advantages over prior inclinometers. Compared to the inherently flawed "straight-lined-sticker" type ski pole inclinometers, some embodiments of my inclinometer are much more accurate and more flexible for different use modes. Compared to all other forms of prior inclinometer, some embodiments of mine are much lower cost, lighter weight, lower bulk, quicker access, and easier to use in multiple "line-of-sight" operating modes.

While the above descriptions contain many specificities, these should not be construed as limitations on the scope of my invention, but as exemplifications of some embodiments thereof. Many other ramifications and variations are possible within the teachings of the various embodiments. For example, the "lines" 112/112a described in various embodiments could be essentially any visually identifiable feature such as the interface between two different colors or shades, or a physical feature such as a groove or ridge in the surface, or a series of dots or dimples, etc. The ski pole could be replaced with a trekking pole, or walking staff, or key fob, or camp fuel bottle, or rigid carrying case, or rigid product packaging (for food, hydration tablets, etc), or countless other objects. The string 912 in FIG. 9 could be replaced by a tab, or nub, or other dedicated feature for holding placed so as to ensure verticality of the object's axis. The sticker 110 could be replaced by a decal, or a tubular sleeve, or other means of getting an image of lines onto a surface.

Also, there is more than one way to express or approximate how to generate these lines. The Principle of Operation section showed one example as an alternate form of the equation used in the first embodiment. There are certainly countless additional forms of equation (or look-up table, etc) that can be used to represent, or to approximate, the intersection of a plane with a cylindrical surface, and the use of any specific form of equation or approximation should not be construed as a limitation on the scope of my invention.

Also, in the Operation section I describe several methods of use, or modes of operation, of certain embodiments of my inclinometer. These are only examples. There are certainly additional methods of use of some of the same embodiments of inclinometer described herein. For example, embodiments of my inclinometer can be used to measure the inclination of line-of-sight from a user to the top of a tree or cliff, and that inclination measurement can be used (along with some trigonometric calculations or the use of a look-up-table) to calculate or estimate the height of that tree or cliff. Any specific methods of use described herein should not be construed as limiting the scope of my invention.

Accordingly, the scope of my invention should be determined by the appended claims and their legal equivalents, and not by the examples given or the specific embodiments illustrated herein.

The invention claimed is:

1. An inclinometer, comprising:
   (a) a surface of approximately cylindrical or near-cylindrical shape,
   (b) a plurality of lines on said surface,
   (c) each of said plurality of lines being such that it appears straight when viewed from certain perspectives, and
   (d) means of ensuring said axis of said surface is approximately vertical,
   whereby said plurality of lines can be used visually to measure or approximate an inclination.

2. The inclinometer of claim 1 wherein said inclination is that of a hill, or mountain slope, or other topographical feature.

3. The inclinometer of claim 1 wherein said inclination is that of a line-of-sight between an observer and an observed object.

4. The inclinometer of claim 1 wherein said plurality of lines are on a sticker or decal applied to said surface.

5. The inclinometer of claim 1 wherein said plurality of lines are printed directly onto said surface.

6. The inclinometer of claim 1 wherein one or more identifying numbers or colors or features indicate the inclination represented by at least one of said plurality of lines.

7. The inclinometer of claim 1 wherein said surface is that of a ski pole shaft, trekking pole shaft, or water bottle.

8. The inclinometer of claim 1 wherein said surface has an approximately cylindrical or approximately conical shape.

9. The inclinometer of claim 1 wherein said surface has an approximately elliptical or approximately teardrop-shaped cross-section.

10. The inclinometer of claim 1 wherein said means of ensuring verticality is supported by the overall shape of the object underlying said surface.

11. The inclinometer of claim 1 wherein said means of ensuring verticality includes the use of a dedicated feature for holding.

12. The inclinometer of claim 1 wherein said plurality of lines are covered by a clear or semi-transparent protective layer.

13. A method of measuring inclination, comprising:
   (a) providing a side view of an incline,
   (b) providing a surface of approximately cylindrical or near-cylindrical shape,
   (c) providing a plurality of lines on said surface, each said line being such that when viewed from the side it appears straight, at a predetermined angle to the axis of said surface,
   (d) holding said surface, with said incline in the background, in such a way that said surface's said axis is approximately vertical, and said plurality of lines slant generally in the same direction as said incline,
   (e) observing the angles of said plurality of lines in comparison with the angle of said incline in the background,
   whereby the approximate inclination of said incline can be determined by visual comparison with said plurality of lines.

14. The method of claim 13 wherein one or more identifying numbers or colors or features indicate the inclination represented by at least one of said plurality of lines.

15. The method of claim 13 wherein said surface is that of a ski pole shaft, trekking pole shaft, or water bottle.

16. The method of claim 13 wherein said incline is a hill, or mountain slope, or other topographical feature.

17. A method of measuring inclination, comprising:
   (a) providing an observer,
   (b) providing an object,
   (c) providing a surface of approximately cylindrical or near-cylindrical shape,
   (d) providing a plurality of lines on said surface, each of the plurality of lines being such that it appears straight only when viewed from within a plane at a predetermined angle to the axis of said surface,
   (e) holding said surface between said observer and said object in such a way that said surface's said axis is approximately vertical, and said plurality of lines slant generally in the same direction as the line-of-sight between said observer and said object,
   whereby the approximate inclination of the line-of-sight between said observer and said object can be determined by observation of the apparent shape of said plurality of lines.

18. The method of claim 17 wherein one or more identifying numbers or colors or features indicate the inclination represented by at least one of said plurality of lines.

19. The method of claim 17 wherein said surface is that of a ski pole shaft, trekking pole shaft, or water bottle.

20. The method of claim 17 wherein said line-of-sight matches the angle of a hill or mountain slope or other topographical feature.

\* \* \* \* \*